US006924948B2

United States Patent
Oshima et al.

(10) Patent No.: US 6,924,948 B2
(45) Date of Patent: Aug. 2, 2005

(54) MULTIFOCAL LENS SYSTEM FOR DIGITAL CAMERAS

(75) Inventors: Shigeru Oshima, Tokyo (JP); Yoshio Yamazaki, Kanagawa (JP)

(73) Assignee: ARC Design, Inc., Tokyo (JP)

( * ) Notice: Subject to any disclaimer, the term of this patent is extended or adjusted under 35 U.S.C. 154(b) by 151 days.

(21) Appl. No.: 10/645,460

(22) Filed: Aug. 21, 2003

(65) Prior Publication Data

US 2005/0041300 A1 Feb. 24, 2005

(51) Int. Cl.[7] .......................... G02B 9/00; G02B 13/16; G03B 19/12; H04N 5/225
(52) U.S. Cl. ...................... 359/754; 348/344; 348/335; 396/356
(58) Field of Search ............................... 348/272, 294, 348/335, 344, 374, 376; 359/672, 754; 396/73, 274, 351, 356

(56) References Cited

U.S. PATENT DOCUMENTS 4,204,760 A * 5/1980 Kobayashi .................... 396/73
4,264,175 A * 4/1981 Hayata et al. ................ 396/73
4,527,874 A * 7/1985 Ohmura ........................ 396/73
4,801,958 A * 1/1989 Stoneham .................... 396/73

* cited by examiner

Primary Examiner—David N. Spector
(74) Attorney, Agent, or Firm—Senniger Powers

(57) ABSTRACT

A multifocal lens system to be used for digital cameras for setting any one of a plurality of lenses in a picture taking (image capturing) position comprising a wide-angle lens (shorter focal length lens) mounted in front of an image sensor in a picture taking (image capturing) position, a telephoto lens (longer focal length lens) mounted alongside the wide-angle lens, a parallelogram prism (rhombic prism) or a pair of triangular prisms removably arranged between the two lenses at the rear of them. When the wide-angle lens is to be used, the parallelogram prism or one of the two triangular prisms is to be removed from the rear of wide-angle lens so that the wide-angle lens can be focused on the sensor enabling light to pass therethrough. The telephoto lens is so positioned that it may be focused on the image sensor through the parallelogram prism or being reflected by the triangular prisms enabling light to pass therethrough when a part of the parallelogram prism or one of the two triangular prisms is placed in front of the image sensor to cover the imaging area of the sensor and to shut the light through the wide-angle lens to the sensor. By moving the prism from the rear of each lens, one of the two lenses can be positioned for picture taking (image capturing).

6 Claims, 3 Drawing Sheets

US 6,924,948 B2

MULTIFOCAL LENS SYSTEM FOR DIGITAL CAMERAS

BACKGROUND OF THE INVENTION

1. Field of the Invention

The present invention relates to an optical system that has a plurality of lenses of two different focal lengths in a digital camera (hereinafter referred to as DSC), and by using a parallelogram prism (rhombic prism) or a pair of triangular prisms those two lenses can be placed in the image capturing position interchangeably.

2. Background Art

To obtain different focal lengths in a camera, usually zoom lenses, multifocal lens turrets and conversion lenses have been commonly used. The zoom lenses are relatively expensive and constructions are complicated and difficult to be made. The lens turret system is much easier than zoom lenses in manufacturing, however, longer focal lenses are always protruded and cannot be retracted in to the camera body, and that makes the camera bulky. There are two kinds of conversion lens. One is to be attached to the front of camera lens, of which the focal magnification is very limited due to its size, and it is extremely difficult to obtain a focal magnification of two times. This type of front conversion lenses is too bulky for a DSC, because usually the sizes of DSC lenses are much smaller than analogue camera lenses, and when used in a DSC, the durability of the total lens with a front conversion lens will be in question. The other is a behind lens type conversion (a rear conversion lens), which is to be inserted behind the master lens to change the focal length of the master lens, but also the ratio of focal magnification is limited, and further more the mechanism to insert the rear conversion lens behind the very small sized DSC master lens is very complicated and not easy to be designed and manufactured.

FIG. 1 shows a typical design of lens turret system, of which telephoto lens is protruded from the camera, and FIG. 2 shows an example of a front conversion lens to be attached to a camera, which inevitably becomes quite large.

It is therefore an object of this invention to provide a multifocal lens system which is much less expensive and easier in manufacturing than zoom lenses, and not so bulky as lens turret systems and front conversion lenses, and not so complicated in mechanism as rear conversion lenses, and yet which can easily obtain large magnification like 3 times or over.

SUMMARY OF THE INVENTION

A primary object of the present invention is to provide a multifocal lens system for digital cameras comprising a wide-angle lens, a telephoto lens, a parallelogram prism or a pair of triangular prism, and a certain mechanism with which the prism or the prisms can be moved sliding from side to side. The wide-angle lens is placed in front of an image sensor such as CCD or C-MOS aligning its optical axis with the center of the image sensor. The telephoto lens is placed alongside the wide-angle lens. A parallelogram prism or a pair of triangular prisms is placed movably at the rear of those two lenses. When the wide-angle lens is to be used, the parallelogram prism or one of the two triangular prisms is positioned not to cover any part of the sensor, and stay only at the rear of the telephoto lens, so that the wide-angle lens can be focused on the sensor to capture an image. When the telephoto lens is to be used, the parallelogram prism or one of the two triangular prisms moves onto the image sensor to cover its sensing area enabling light from the object to pass therethrough and shutting light through the wide-angle lens, so that the telephoto lens can be focused on the sensor to capture an image.

Thus the multifocal lens system according to the present invention is so designed as to be capable of changing focal length instantly by moving only the parallelogram prism or the two triangular prisms at the rear of the wide-angle and telephoto lenses from side to side. It is not necessary for the multifocal lens system according to the present invention to rotate both of the wide-angle and telephoto lenses using a turret mechanism that is bulky and occupies much more space, also it is not necessary to attach a bulky conversion lens onto the master lens, and further it is not necessary to insert any auxiliary lenses behind the master lens to change the focal length of the lens system, which is rather complicated in mechanism and yet not capable enough to change the focal length magnification effectively.

Moreover the multifocal lens system according to the present invention uses the telephoto lens of which the light path is reflected through the parallelogram prism or reflected on the mirror surfaces of the two triangular prisms, and consequently the distance between the wide-angle lens and the focal plane of the sensor and the physical distance between the telephoto and the focal plane of sensor could be almost the same, and the telephoto lens can be placed at the same level as the wide-angle lens preventing the telephoto lens from protruding much higher than the level of wide-angle lens.

DETAILED DESCRIPTION OF THE INVENTION

Figure 3:
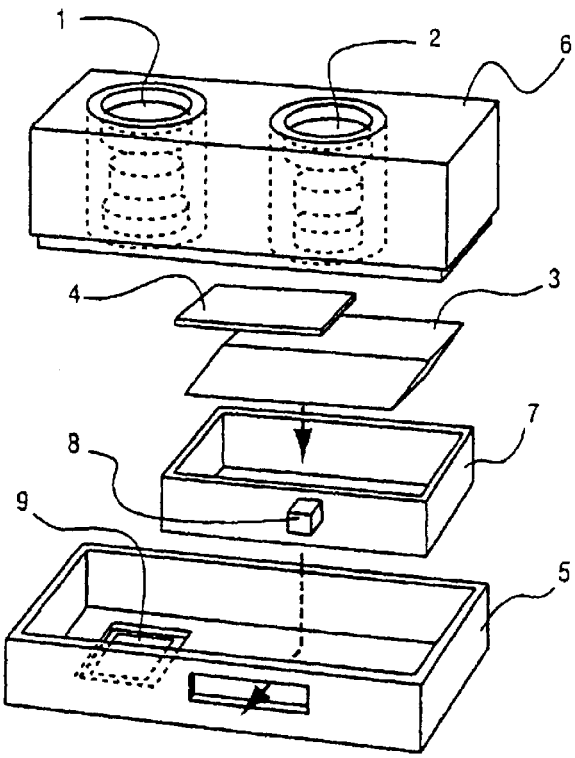
FIG. 3 is an exploded perspective view of the first embodiment of the multifocal lens system according to the present invention.
Figure 4:
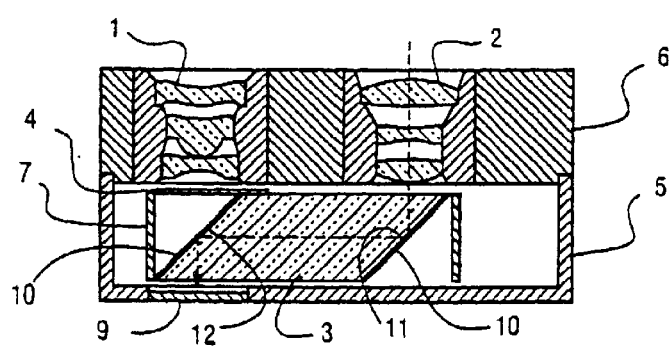
FIG. 4 is a partly cross-sectional view of the multifocal lens system of the first embodiment according to the present invention to show the status that the telephoto lens is in use.
Figure 5:
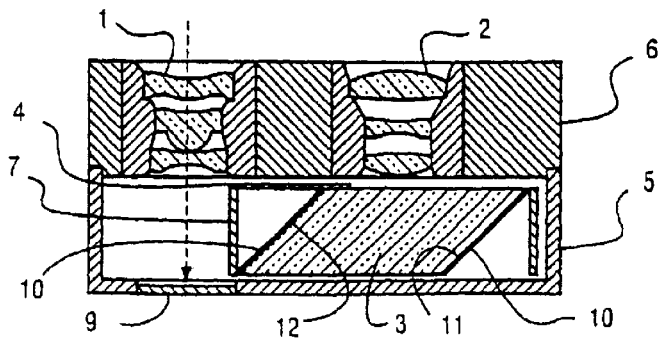
FIG. 5 is a partly cross-sectional view of the multifocal lens system of the first embodiment according to the present invention to show the status that the wide-angle lens is in use.

FIGS. 3, 4 & 5 show a preferable embodiment of the present invention, namely the multifocal lens system for digital cameras, which comprises a wide-angle lens (1), a telephoto lens (2), a parallelogram prism (a rhombic shaped prism) (3), a shutter blade (4) attached on said prism, a housing (5), a lens holder (6) and a prism holder (7). The wide-angle lens (1) and the telephoto lens (2) are positioned side by side on top of the lens holder (6) as shown by FIGS. 4 & 5. Inside the housing (5), there is the parallelogram prism (3), which is held by the prism holder (7). The prism holder (7) is movable from side to side at the rear of the wide-angle (1) and telephoto (2) lenses sliding inside the housing (5), and the prism holder (7) can be operated by a knob (8) from side to side from the outside of the housing (5). On the prism holder (7) the shutter blade (4) is provided, and when the wide-angle lens (1) is in use as shown by FIG. 5, the shutter blade (4) and the parallelogram prism (3) are removed from the rear of the wide-angle lens (1) so that the light that comes through the wide-angle lens (1) can reach the image sensor (9) that is placed underneath the wide-angle lens (1) and form an image of object on the focal plane of the image sensor (9). When the wide-angle lens (1) is in use, the parallelogram prism (3) and the prism holder (7) shut off the light that comes through the telephoto lens (2) and the light is unable to reach the image sensor (9). When the telephoto lens (2) is in use as shown by FIG. 4, the parallelogram prism (3) is moved to the rear of the wide-angle lens (1), and the shutter blade (4) shuts off the light coming through the wide-angle lens (1) having the light be unable to reach the image sensor (9). The parallelogram prism (3) has two inclined surfaces (10), and the outer side of inclined surfaces (10) are coated by aluminum metalizing, or that sort of vacuum deposition so that the inner sides of those coated inclined surfaces (10) can work as mirrors, namely mirror (11) and mirror (12). The position of the telephoto lens (2) is so designed as to enable the light coming through the telephoto lens (2) to be reflected by the mirrors (11 & 12) of the parallelogram prism (3) and to reach the image sensor (9) to form an image of object properly on the sensor focal plane.

As described so far, when the parallelogram prism (3) is removed from the rear of the wide-angle lens (1), the wide-angle lens (1) can be used to capture images shutting the light coming through the telephoto lens (2) as shown by FIG. 5, and when the parallelogram prism (3) is moved to the rear of the wide-angle lens (1), the light coming through the wide-angle lens (1) is shut by the shutter blade (4) and does not reach the image sensor (9), meanwhile the light coming through the telephoto lens (2) goes through the parallelogram prism (3) being reflected by the two mirrors (11 & 12) of the inclined surfaces (10) of the parallelogram prism (3) and reaches the image sensor to form an image there, and the telephoto lens (2) can be used as shown by FIG. 4.

Thus this multifocal lens system according to the present invention can set one of these two lenses, namely the wide-angle lens (1) and the telephoto lens (2) in an image capturing position by simply and easily switching the position of the parallelogram prism (3).

Further more, by using the two mirrors (11 & 12) of the parallelogram prism (3), the light path of the telephoto lens (2) can be bent twice, and consequently the distance between the telephoto lens (2) and the image sensor (9) can be adjusted same as the distance between the wide-angle lens (1) and the image sensor (9). As the result of this distance adjustment, the wide-angle lens (1) and the telephoto lens (2) can be placed at the same level on the lens holder (6) so that the total size of the multifocal lens system of the present invention can be much more compact in comparison with other systems like lens-turret mechanism or conversion lens systems.

Figure 6:
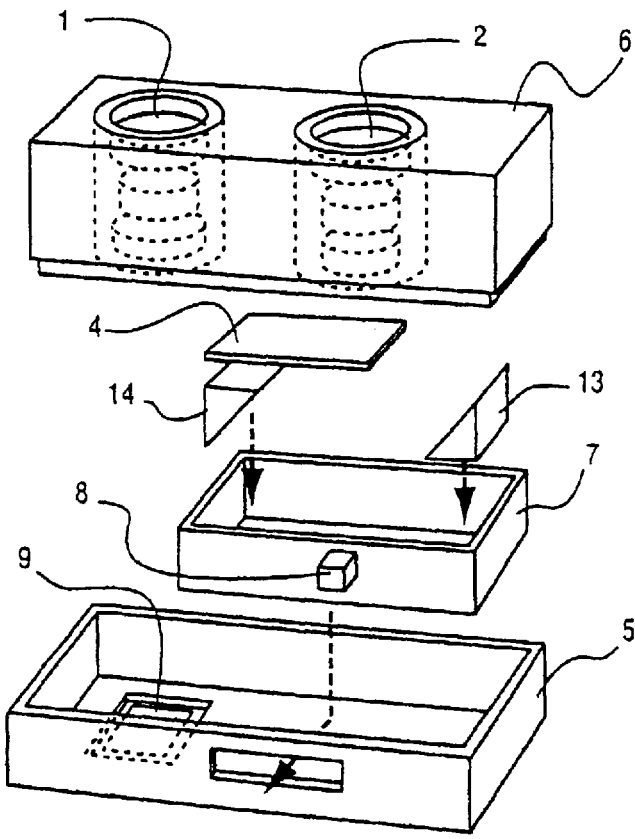
FIG. 6 is an exploded perspective view of the second embodiment of the multifocal lens system according to the present invention.
Figure 7:
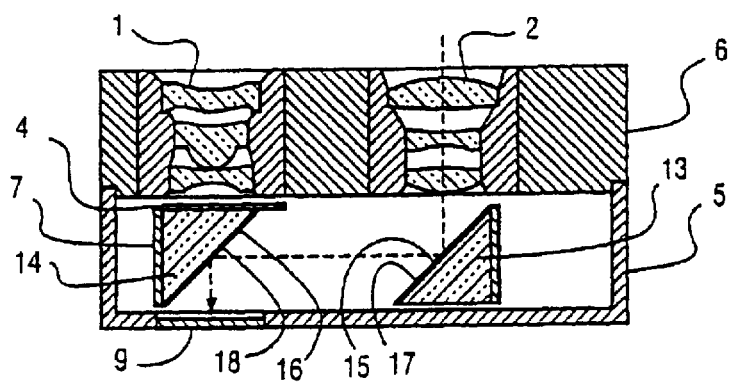
FIG. 7 is a partly cross-sectional view of the multifocal lens system of the second embodiment according to the present invention to show the status that the telephoto lens is in use.
Figure 8:
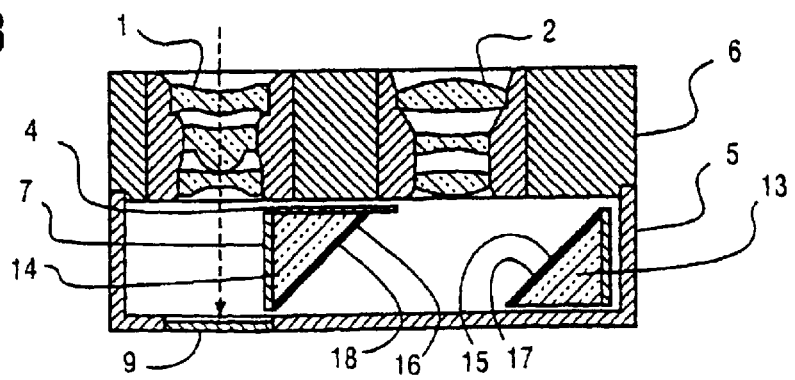
FIG. 8 is a partly cross-sectional view of the multifocal lens system of the second embodiment according to the present invention to show the status that the wide-angle lens is in use.

FIGS. 6, 7 & 8 show another preferable embodiment of the present invention, namely the multifocal lens system for digital cameras, which comprises a wide-angle lens (1), a telephoto lens (2), two triangular prisms (right angle prisms) (13 & 14), a shutter blade (4), a housing (5), a lens holder (6) and a prism holder (7). The wide-angle lens (1) and the telephoto lens (2) are positioned side by side on top of the lens holder (6) as shown by FIGS. 7 & 8. Inside the housing (5), there are the triangular prisms (13 & 14), which are held by the prism holder (7). The prism holder (7) is movable from side to side at the rear of the wide-angle (1) and telephoto (2) lenses sliding inside the housing (5), and the prism holder (7) can be operated by a knob (8) from side to side from the outside of the housing (5). On the prism holder (7) the shutter blade (4) is provided, and when the wide-angle lens (1) is in use, the shutter blade (4) and the prism holder (7) are removed from the rear of the wide-angle lens (1) so that the light that comes through the wide-angle lens (1) can reach the image sensor (9) and form an image of object on the focal plane of the image sensor (9). When the wide-angle lens (1) is in use, the triangular prisms (13 & 14) and the prism holder (7) shut off the light that comes through the telephoto lens (2) and the light is unable to reach the image sensor (9). When the telephoto lens (2) is in use as shown by FIG. 7, one of the triangular prisms (14) is moved to the rear of the wide-angle lens (1), and the shutter blade (4) shuts off the light coming through the wide-angle lens (1) having the light be unable to reach the image sensor (9). Each of the triangular prisms (13 & 14) has an inclined surface (15 and 16), and the outer side of the surfaces (15 & 16) of the triangular prisms are coated by aluminum metalizing, or that sort of vacuum deposition so that the outer sides of those coated inclined surfaces (15 & 16) can work as mirrors, namely mirror (17) and mirror (18). The position of the telephoto lens (2) is so designed as to enable the light coming through the telephoto lens (2) to be reflected by the mirrors (17 & 18) of the triangular prisms (13 & 14) and to reach the image sensor to form an image of object properly on the sensor focal plane.

As described so far, when the triangular prisms (13 & 14) are removed from the rear of the wide-angle lens (1), the wide-angle lens can be used to capture images shutting the light coming through the telephoto lens (2), and when the triangular prism (14) is moved to the rear of the wide-angle lens (1), the light coming through the wide-angle lens (1) is shut by the shutter blade (4) and does not reach the image sensor (9), meanwhile the light coming through the telephoto lens (2) goes along the triangular prisms (13 & 14) being reflected by the two mirrors (17 & 18) of the inclined surfaces (15 & 16) of the triangular prisms (13 & 14) and reaches the image sensor (9) to form an image there, and the telephoto lens (2) can be used.

Thus this multifocal lens system according to the present invention can set one of these two lenses, namely the wide-angle lens (1) and the telephoto lens (2) in an image capturing position by simply and easily switching the position of the triangular prisms (13 & 14).

Further more, by using the two mirrors (17 & 18) of the triangular prisms (13 & 14), the light path of the telephoto lens (2) can be bent twice, and consequently the distance between the telephoto lens (2) and the image sensor (9) can be adjusted same as the distance between the wide-angle lens (1) and the image sensor (9). As the result of this distance adjustment, the wide-angle lens (1) and the telephoto lens (2) can be placed at the same level on the lens holder (6) so that the total size of the multifocal lens system of the present invention can be much more compact in comparison with other systems like lens-turret mechanism or conversion lens systems.

List of Reference Numerals

Figure 1:
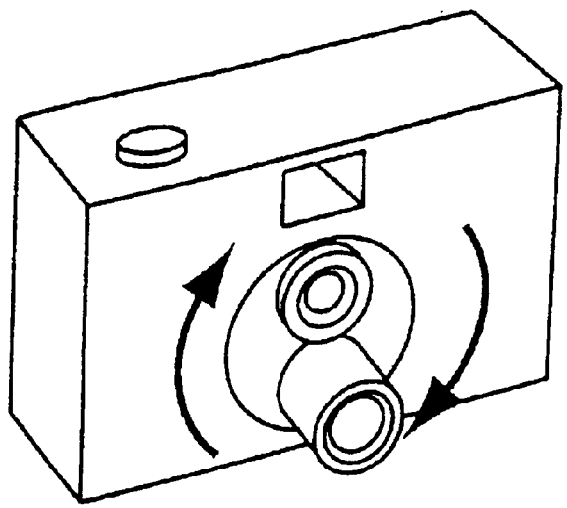
FIG. 1 is a perspective view of a conventional lens turret system.
Figure 2:
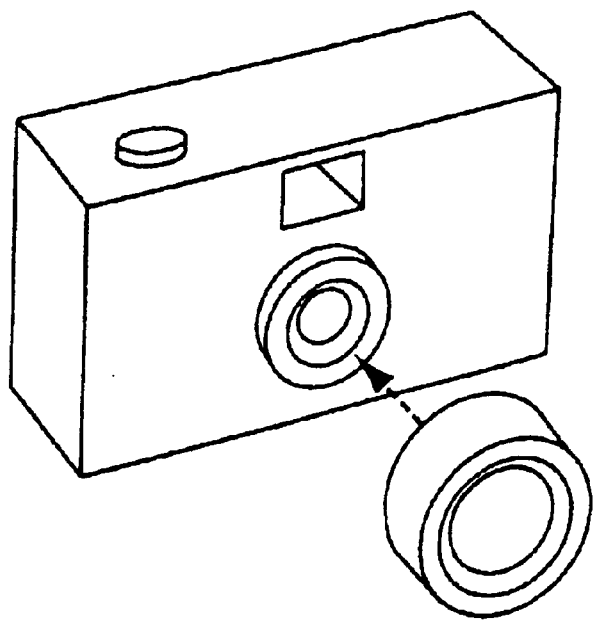
FIG. 2 is a perspective view of a front conversion lens system.

FIG. 3
1. Wide-angle lens
2. Telephoto lens
3. Parallelogram prism
4. Shutter blade
5. Housing
6. Lens holder
7. Prism holder
8. Knob
9. Image sensor FIG. 4
1. Wide-angle lens
2. Telephoto lens
3. Parallelogram prism
4. Shutter blade
5. Housing
6. Lens holder
9. Image sensor
10. Inclined surfaces
11. Mirror
12. Mirror FIG. 5
1. Wide-angle lens
2. Telephoto lens
3. Parallelogram prism
4. Shutter blade
5. Housing
6. Lens holder
9. Image sensor
10. Inclined surfaces
11. Mirror
12. Mirror FIG. 6
1. Wide-angle lens
2. Telephoto lens
4. Shutter blade
5. Housing
6. Lens holder
7. Prism holder
8. Knob
9. Image sensor
13. Triangular prism
14. Triangular prism FIG. 7
1. Wide-angle lens
2. Telephoto lens
4. Shutter blade
5. Housing
6. Lens holder
9. Image sensor
13. Triangular prism
14. Triangular prism
15. Inclined surface
16. Inclined surface
17. Mirror
18. Mirror FIG. 8
1. Wide-angle lens
2. Telephoto lens
4. Shutter blade
5. Housing
6. Lens holder
9. Image sensor
13. Triangular prism
14. Triangular prism
15. Inclined surface
16. Inclined surface
17. Mirror
18. Mirror

What is claimed is:

1. A multifocal lens system for digital cameras comprising:
   a wide-angle lens which is placed in front of an image sensor having the center of the image sensor on the optic axis of the wide-angle lens so that the wide-angle lens can be focused on the image sensor;
   a telephoto lens which is placed alongside the wide-angle lens;
   a parallelogram prism which is made of glass, plastic or the like and is placed and movable from side to side at the rear of said lenses and through which the telephoto lens can be focused on the image sensor when said prism is placed in front of the sensor and at the rear of the wide-angle lens covering the sensing area of the image sensor and shutting the light through the wide-angle lens; and
   a means of moving the prism from the rear of the wide-angle lens not to let the prism cover the image sensing area of the image sensor and to let the wide-angle lens focus on the image sensor or moving the prism onto the image sensor and to the rear of the wide-angle lens so that the light through the wide-angle lens can be shut off and the telephoto lens can be focused on the image sensor through the prism.

2. A multifocal lens system as claimed in claim 1, wherein the prism position can be changed by sliding the prism horizontally from the rear of the wide-angle lens toward the rear of the telephoto lens to set the multifocal lens system at the wide-angle image capturing position or from the wide-angle image capturing position onto the image sensor to set the system at the telephoto image capturing position.

3. A multifocal lens system as claimed in claim 1, wherein the two outer inclined surfaces of the parallelogram prism are coated by aluminum metalizing or that sort of vacuum deposition so that the inner surfaces of the inclined surfaces can be used as mirrors.

4. A multifocal lens system comprising:
   a wide-angle lens which is placed in front of an image sensor having the center of the image sensor on the optic axis of the wide-angle lens so that the wide-angle lens can be focused on the image sensor;
   a telephoto lens which is placed alongside the wide-angle lens;
   two triangular prisms which are made of glass, plastic or the like and placed and movable together from side to side at the rear of said lenses and through which the telephoto lens can be focused on the image sensor when one of said prisms is placed in front of the sensor and at the rear of the wide-angle lens covering the sensing area of the image sensor and shutting the light through the wide-angle lens;
   a means of moving the prisms from the rear of the wide-angle lens not to let the prisms cover the image sensing area of the image sensor and to let the wide-angle lens focus on the image sensor or moving the prisms onto the image sensor and to the rear of the wide-angle lens so that the light through the wide-angle lens can be shut off and the telephoto lens can be focused on the image sensor through the prisms.

5. A multifocal lens system as claimed in claim 4, wherein the positions of the prisms can be changed by sliding the prisms horizontally from the rear of the wide-angle lens toward the rear of the telephoto lens to set the multifocal lens system at the wide-angle image capturing position or from the wide-angle image capturing position onto the image sensor to set the system at the telephoto image capturing position.

6. A multifocal lens system as claimed in claim 4, wherein the outer inclined surface of each prism is coated by aluminum metalizing or that sort of vacuum deposition so that the outer side of the inclined surface of each prism can be used as a mirror.

* * * * *